Aug. 10, 1954 W. L. WOOLF 2,686,057

RECORDER FOR SIMULTANEOUS MULTIPLE RECORDING UPON FILMS, TAPES, OR WIRES

Filed July 30, 1947 7 Sheets-Sheet 1

INVENTOR.
WILLIAM L. WOOLF
BY Kenyon & Kenyon
ATTORNEYS

Aug. 10, 1954 W. L. WOOLF 2,686,057

RECORDER FOR SIMULTANEOUS MULTIPLE RECORDING UPON FILMS, TAPES, OR WIRES

Filed July 30, 1947 7 Sheets-Sheet 2

INVENTOR.
WILLIAM L. WOOLF
BY Kenyon & Kenyon
ATTORNEYS

Aug. 10, 1954 W. L. WOOLF 2,686,057

RECORDER FOR SIMULTANEOUS MULTIPLE RECORDING UPON FILMS, TAPES, OR WIRES

Filed July 30, 1947 7 Sheets-Sheet 3

INVENTOR.
WILLIAM L. WOOLF
BY Kenyon & Kenyon
ATTORNEYS

Aug. 10, 1954 W. L. WOOLF 2,686,057

RECORDER FOR SIMULTANEOUS MULTIPLE RECORDING UPON FILMS, TAPES, OR WIRES

Filed July 30, 1947 7 Sheets-Sheet 4

INVENTOR.
WILLIAM L. WOOLF
BY
Kenyon & Kenyon
ATTORNEYS

INVENTOR.
WILLIAM L. WOOLF
BY
Kenyon & Kenyon
ATTORNEYS

Aug. 10, 1954 W. L. WOOLF 2,686,057

RECORDER FOR SIMULTANEOUS MULTIPLE RECORDING UPON FILMS, TAPES, OR WIRES

Filed July 30, 1947 7 Sheets-Sheet 6

INVENTOR.
WILLIAM L. WOOLF
BY Kenyon & Kenyon
ATTORNEYS

INVENTOR.
WILLIAM L. WOOLF
BY Kenyon & Kenyon
ATTORNEYS

Patented Aug. 10, 1954 2,686,057

UNITED STATES PATENT OFFICE 2,686,057

RECORDER FOR SIMULTANEOUS MULTIPLE RECORDING UPON FILMS, TAPES, OR WIRES

William L. Woolf, Hoboken, N. J.

Application July 30, 1947, Serial No. 764,628

3 Claims. (Cl. 274—11)

This invention relates to recording devices and more particularly to recorders for simultaneous multiple recording upon films, tapes, or wires, hereinafter called strip recording media.

In the prior art various recorders are known for impressing recordings with a recording stylus upon a single tape or film. However, there has been no satisfactory recorder developed for simultaneous impression recording upon a number of films, and this has been one great drawback to the commercial production of such film recordings. Previously when a number of impression recordings were desired, a number of separate recorders were required and used, each with its own driving motor, tracking mechanism, etc., or a number of single recordings made one after another on one recorder. Since most film recorders of the impression type record in linear grooves with a step at the end of each groove leading to the next linear groove instead of in continuous or spiral grooves, the simultaneous use of a number of such recordings each producing a single film recording requires some method of synchronizing the operation of the various recorders in order that the film recording made upon any one will be interchangeable for use upon any suitable playback machine. Also this method of large scale production of a number of similar film recordings is economically very costly due to the lengthy time required for changing the film upon each recorder between recording periods.

Accordingly, the principal object of this invention is to provide a single recorder for simultaneously making a number of duplicate recordings upon film, tape, or wire.

Another object of this invention is to provide such a recorder in which the tracking of the recording heads is synchronized, thus insuring that the films are interchangeable for use upon any suitable playback machine.

Another object of this invention is to provide a multiple film recording machine in which the time required for removing the recorded films from the machine and replacing them with fresh film is reduced to an absolute minimum in order to increase the available recording time of the machine to a maximum value.

Another object of this invention is to provide a type of reel for a recording machine utilizing a continuous length of film which alleviates the the usual wear on the film due to the angle to the recording bed at which the film reel is necessarily placed.

Still another object of this invention is to provide such a multiple film recorder in which tracking of the recording heads is accomplished in a simple reliable manner without the use of notches cut in the edge of the film or conducting portions inserted between the sprocket holes, such as have, for instance, been used in the prior art.

Still another object of this invention is to provide such a multiple film recorder in which a friction feed of the films is utilized during recording in order to reduce the wear on the sprocket holes which may later be utilized in the playback devices.

Other and further objects will appear during the course of the following description when taken with the accompanying drawings in which.

One major feature of this invention resides in the provision of a single recording bed or drum for the simultaneous recording of all films and the use of one or more magazine holders which may be quickly interchanged in the machine. Each magazine holder has secured to it one or more film reel magazines in such a fashion that each magazine may be quickly and readily removed and replaced. On each film reel magazine is rotatably secured an idler pulley or roller so spaced that when the magazine holder and film reel magazine are in the secured position, this idler is disposed adjacent but does not bear against the surface of the recording drum. On each magazine is also secured a plurality of film reels so spaced that their centers lie on a common cylindrical surface described about the axis of the idler. This latter feature insures that there is always the same length of film loop between the reel and the recording drum for ease of synchronized tracking positioning of the films.

Figure 1:
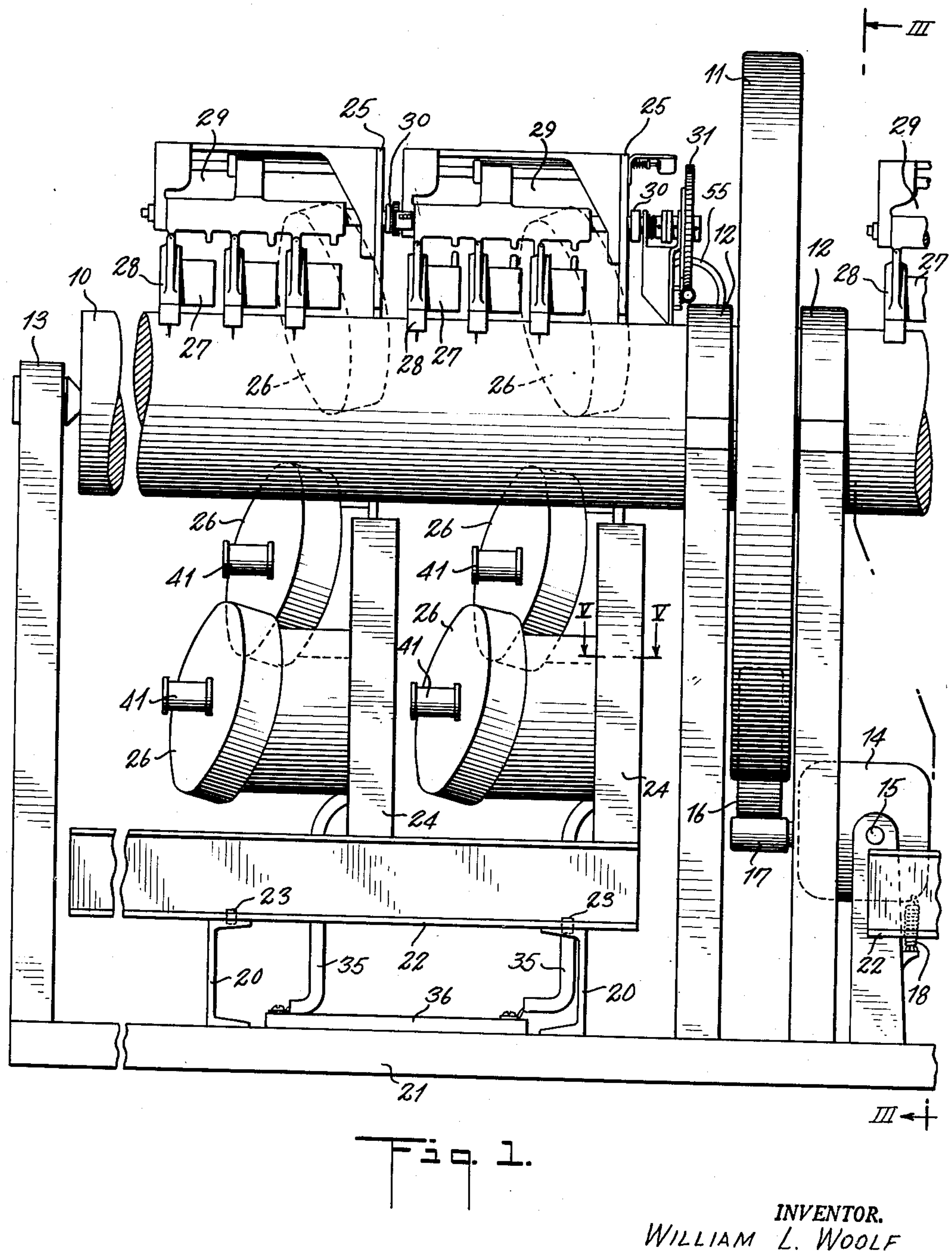
Fig. 1 is a frontal elevation view of one embodiment of this invention.

As shown in Fig. 1, a precisely machined shaft or drum 10 is utilized as the recording bed. This drum 10 has located near its center a flywheel 11 and is supported adjacent this flywheel by means of bearings 12. An end or thrust bearing 13 is provided at each end of drum 10. A suitable drive motor 14 is pivotally mounted as at 15 and rotates drum 10 and flywheel 11 due to the intervening roller 16, which bears upon the periphery of flywheel 11 and motor pulley 17 of motor 14, and the tension of spring 18. Horizontal channel members 20 are secured to foundation 21 and atop these are secured by any suitable means magazine holders 22, one on either side of flywheel 11. Dowel pins 23 are utilized to insure the proper positioning of holders 22. A number of L-shaped sections 24, one for each magazine, are provided on each holder 22, and in each section 24 is provided a slot for the reception of a film reel magazine 25 as can be seen more clearly in Figs. 2, 3, and 5. Because of space limitations only two L-shaped channel sections 24 and two complete cooperating film reel magazine assemblies are shown, but it will be obvious that any desired number can be provided for each holder 22. To each magazine 25 are secured three film reels 26 and three corresponding recording heads 27 and playback heads 28. These heads 27 and 28 are secured to their respective magazine 25 by means of a tracking mechanism shown generally at 29 and are aligned so that each playback head 28 rides in the sound track made by its corresponding recording head 27. Adjacent tracking mechanisms 29 are connected together by a coupling 30, all tracking mechanisms 29 being driven from a single tracking worm wheel 31. A typical tracking mechanism 29 and the drive common to all mechanisms 29 located on one side of flywheel 11 are shown in more detail in Figs. 6, 7, and 8. A similar tracking mechanism drive is provided for all tracking mechanisms 29 located on the other side of flywheel 11, but is not shown in Fig. 1 because of space limitations. When a magazine 25 is inserted into its respective L-shaped section 24, electrical connections are automatically made through plugs, not shown, from its recording heads 27 and playback heads 28 through cable 35 to terminal plug 36. Plug 36 is manually connected to a corresponding plug prior to use of the recorder as will be pointed out hereinafter. The details of the mounting of reels 26 will be discussed in connection with Figs. 4, 11, and 12, but it is to be noted that a recording head 27 and playback head 28 are provided for and so mounted in relation to each film reel 26 that they will be in register with recording drum 10 and the film of their reel during recording. In order to clarify the drawings, reels 26 and their supports have been shown somewhat schematically in this figure and no film has been shown upon the reels. Also, certain idlers utilized for supporting and guiding the film have been omitted from Fig. 1, but these are shown in detail in Figs. 2 and 3.

Figure 2:
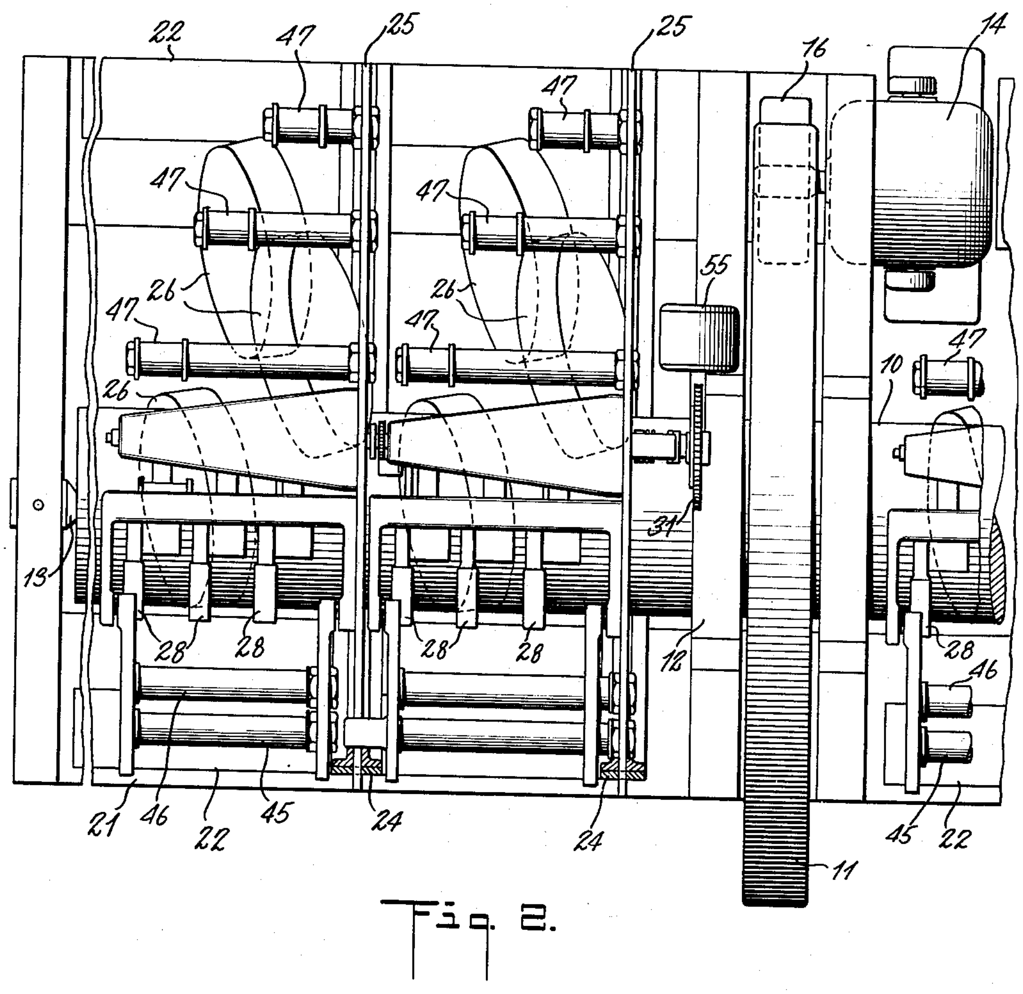
Fig. 2 is a plan view from above of the embodiment shown in Fig. 1.

In Fig. 2 has been shown a plan view from above of the embodiment of Fig. 1 in order to demonstrate more clearly the space relationship of the various parts, and here is illustrated the manner in which each magazine 25 fits into the channel of its respective L-shaped section 24. It is to be noted that the three reels 26 mounted upon each magazine 25 are each at a different distance therefrom so that the three films of each magazine are spaced apart laterally and fed side by side over the recording drum 10, each film being in register with the drum and its respective recording head 27 and playback head 28 as above-described. Various idlers for supporting and guiding the films during recording are also shown in their space relation, and these will be discussed more fully in connection with Fig. 4.

Figure 3:
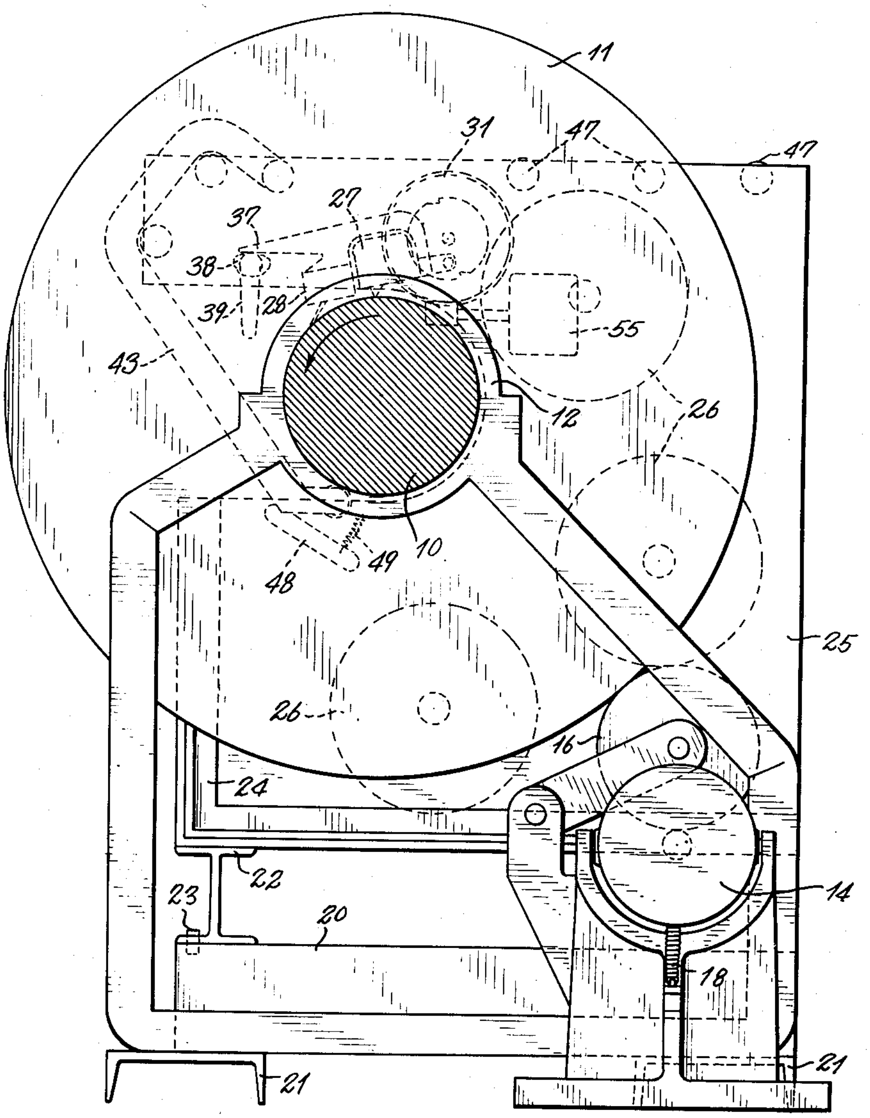
Fig. 3 is a sectional view taken along line III—III of Fig. 1.

In Fig. 3 is shown a sectional view along line III—III of Fig. 1 in order to demonstrate more clearly the space relation between the reels 26, a recording head 27, playback head 28, and the recording drum 10; flywheel 11, idler 16, and motor 14; channel members 20, foundation 21, a magazine holder 22, and a dowel 23; an L-shaped section 24 and a magazine 25; and the manner in which motor 14 is mounted separately from foundation 21 in order to reduce vibration. Also, a bracket 37 is shown connected to playback head 28 and a similar adjacent bracket (not shown) is connected to recording head 27. Both brackets contact cam 38, which is actuated by moving arm 39, and the surface of cam 38 is so formed that heads 27 and 28 may be raised from contact with the film separately or together, as desired by the operator, according to the position of arm 39 and cam 38.

Figure 4:
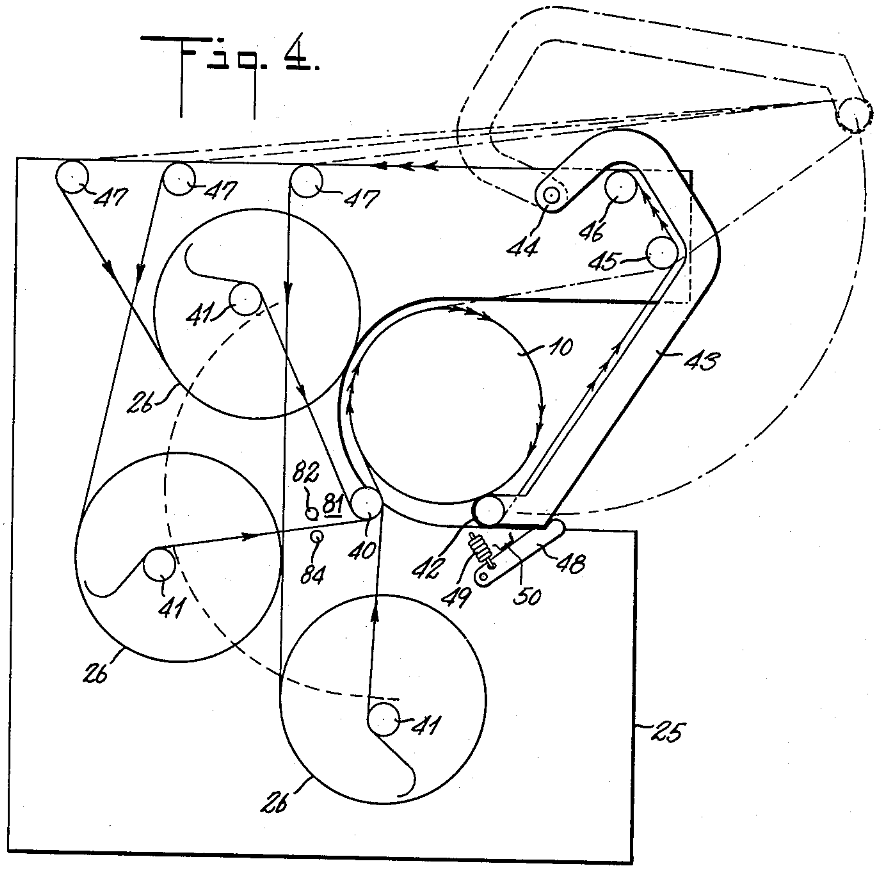
Fig. 4 is a view showing salient features of the type of film reel magazine utilized in the embodiment of Fig. 1.

In Fig. 4 is shown, in somewhat schematic form, a magazine 25 in position adjacent recording drum 10. The film from each reel 26 passes around a common idler 40 which is disposed adjacent but does not bear against the periphery of recording drum 10, and the center of each reel 26 lies on a common cylindrical surface described about the center of idler 40 as shown by the dotted arcuate line. The purpose of this has been discussed above. On each reel 26 is wound a continuous length of film which is fed from the inside and winds up on the outside. The arrows on each line representing a film indicate the path of motion. Each film as it leaves its reel 26 passes over its idler 41, thence around common idler 40, around the drum 10, around a second common idler 42 secured to the end of a bracket arm 43 which is pivoted as at 44, thence around common idlers 45 and 46, and finally around its idler 47 before being wound up on the outside of its own reel 26. Bracket arm 43 is shown in its normal position during recording, in which position it holds its three films firmly against the recording drum 10 so that they are caused to move in the direction shown by the arrows due to the friction between the films and drum 10. A holding bar 48 is provided for bracket arm 43 and this is kept under tension by means of spring 49. A suitable stop 50 is provided for preventing holding bar 48 from moving too far when bracket arm 43 is in the raised position indicated by the dotted lines. Bracket arm 43 is manually moved to this raised position during the time when the film magazines are being loaded or changed in the machine, and the dash-dot lines indicate the fashion in which the film of each reel is then threaded around the idlers. It is also contemplated that a pair of laterally adjustable guides, which may take the form of sapphire rods, will be provided for each film on or adjacent each common idler 40 and 42 in order to insure precise lateral positioning of each film on drum 10 during recording.

It will be noted that due to this space relation of drum 10, idler 40, idlers 47, and reels 26, the length of film path from a reel around the various idlers and drum 10 and then back to itself is exactly the same for each reel. This is desirable when all films are of the same length. It will be obvious that other positionings of the film reels, etc., may be used to achieve the same result. Bracket arm 43 is, of course, swung down from its raised position into its locked position only after the magazine 25 is secured in the recorder, the U-shaped slot shown being provided so that the films, magazine 25, and drum 10 may cooperate as shown. The tracking mechanism 29, recording heads 27, and playback heads 28 have been omitted from this drawing for the sake of clarity.

Figure 5:
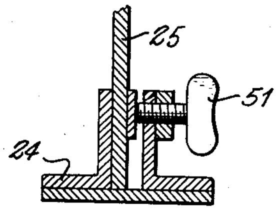
Fig. 5 is a cross-sectional view through plane V—V of Fig. 1, showing one method of mounting and securing the film reel magazine of Fig. 4 in the embodiment of Fig. 1.

Fig. 5 is a cross-sectional view through horizontal plane V—V of Fig. 1, and shows the manner in which a removable magazine 25 is mounted in the upright channel of its L-shaped section 24. A vertical cross-sectional view taken through the horizontal channel of L-shaped section 24 would be similar. Also illustrated is one method by which each magazine 25 may be readily fastened in the proper spaced relation to its L-shaped section 24, this comprising a thumb screw 51 threaded in section 24 as shown.

Figures 6, 7:
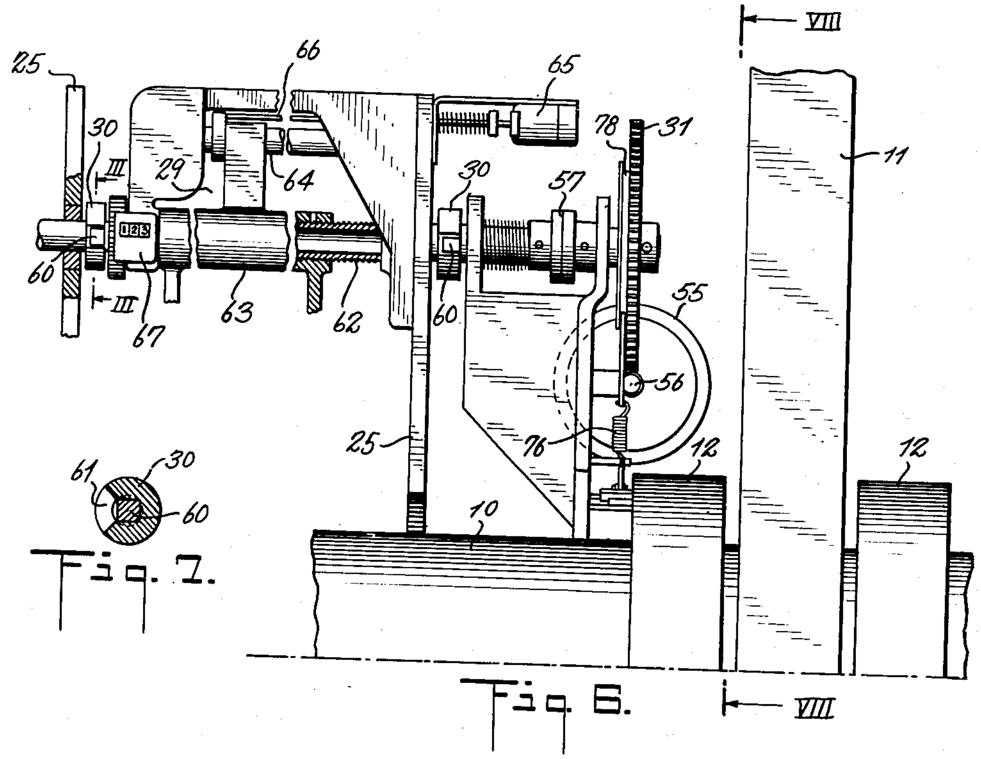
Fig. 6 is a partially cut-away frontal view of the tracking mechanism of the embodiment of Fig. 1.
Fig. 7 is a cross-sectional view through plane VII—VII of Fig. 6.

In Fig. 6 is shown the detail of a typical tracking mechanism 29, which provides motion of its three recording heads 27 and playback heads 28 transverse to the path of motion of the films, and the drive therefor. Rotary motion of motor 55 is transferred through worm gear 56, worm wheel 31, and spring-loaded clutch 57 to a coupling 30. As shown in Fig. 7, this coupling comprises a square end 60 on one shaft and a cooperating slotted end 61 having a V-shaped entering notch portion on the adjacent shaft. By positioning the notch of slotted end 61 in a substantially horizontal position facing the cooperating adjacent square end 60 each time that a magazine 25 is placed in position in the recording machine, a positive mechanical connection is assured for the tracking mechanism 29. Connected to the slotted end of coupling 30 is a lead screw 62 on which brackets 63 ride, and to these brackets 63 are secured recording heads 27 and playback heads 28 (not here shown). A guide bar 64 is also provided for each tracking mechanism 29 in order to insure smooth lateral movement and to prevent bracket 63 from rotating with lead screw 62. A limit switch 65 is provided as shown and is actuated as by means of rod 66 connecting with bracket 63. A suitable numerical counter 67 driven by a gear as illustrated may also be provided for one or all of the tracking mechanisms 29 in order to indicate which track is being recorded, and a suitable manual control (not shown) may also be provided for rotating lead screw 62 manually in either direction as desired, clutch 57 being provided in order to allow such manual movement.

Figure 8:
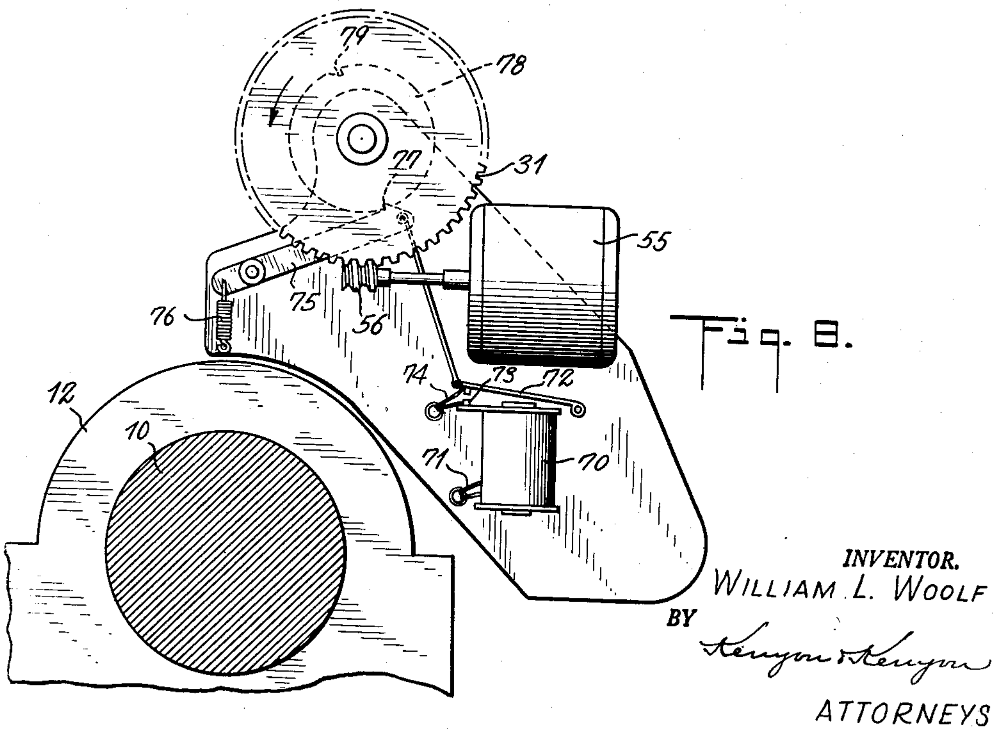
Fig. 8 is a sectional view through plane VIII—VIII of Fig. 6.

In Fig. 8 is shown the manner in which a positive tracking cycle is obtained. When relay 70 is momentarily energized via leads 71 in a manner to be explained presently, armature 72 is drawn downward, closing contacts 73 and completing the electrical circuit to motor 55 through leads 74. At the same time, indexing arm 75 is drawn down against the resisting force of spring 76 and out of notch 77 in indexing disk 78, and disk 78 and worm wheel 31 start to rotate. Thereafter, when relay 70 is de-energized, the pawl of indexing arm 75 riding against the periphery of indexing disk 78 maintains contacts 73 closed. Hence motor 55 keeps turning worm gear 56 and consequently worm wheel 31 until the pawl on indexing arm 75 can enter notch 79, which is located 180° from notch 77 on the periphery of disk 78. At this point contacts 73 open, opening the circuit to motor 55, and worm wheel 31 stops at a definite position fixed by notch 79. Thus the spacing between adjacent tracks on each film is determined by the thread of lead screw 62 (Fig. 6), since due to the instrumentation just explained worm wheel 31 is rotated one-half revolution during each tracking cycle and has a fixed positive starting and stopping position.

Figure 9:
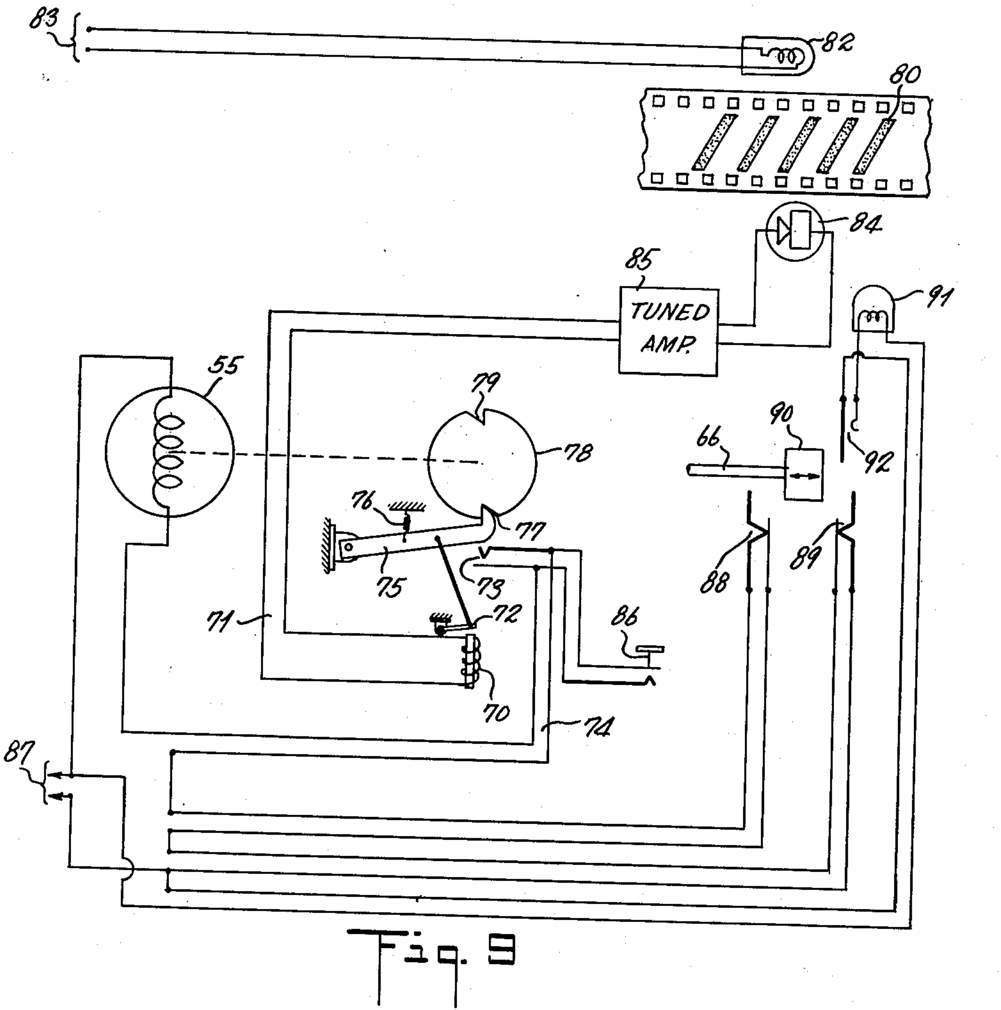
Fig. 9 is a schematic circuit diagram of the tracking mechanism circuit of the embodiment of Fig. 1.

In Fig. 9 is shown the control circuit for the tracking instrumentation just explained drawn in a schematic representation. Each continuous length of film wound on a film reel 26 (Fig. 1) has imprinted upon one section of it a series of regularly spaced opaque strips 80. While printing of the strips is exemplified, any other suitable method of producing opaque strips in or on the film may, of course, be used. Above a loop of the film, as for instance at 81 in Fig. 4, is positioned an exciter lamp 82 which is supplied with energy from a suitable source from lines at 83. Below the film loop and substantially opposite exciter lamp 82 (see also Fig. 4) is placed a photoelectric cell 84 which is connected to the input of a tuned amplifier 85. The output of tuned amplifier 85 is connected via leads 71 to the coil of relay 70, whose armature 72 is connected to indexing arm 75 as above-described. Thus, whenever the opaque strips 80 pass between exciter lamp 82 and photoelectric cell 84, an electrical wave will be produced at the input of tuned amplifier 85 whose frequency is dependent upon the spacing between the strips 80 and the speed with which the film upon which the strips 80 are imprinted is travelling. By tuning amplifier 85 to this specified frequency there will be produced in response to this wave input an output which will actuate relay 70 for a period of time dependent upon the number of strips 80 and the speed which they are travelling relative to lamp 82 and photoelectric cell 84. As previously explained, operation of relay 70 closes the electrical circuit to motor 55 through contacts 73, thus preventing the pawl of index arm 75 from reentering notch 77 of indexing disk 78 due to the disk's subsequent rotation. Hence contacts 73 are maintained closed until the pawl can enter notch 79. Only a relatively small number of opaque strips 80 are provided so that relay 70 is de-energized prior to the time the pawl of index arm 75 is ready to be drawn into notch 79 due to the tension of spring 76. As shown, a suitable manual switch 86 may be provided to bypass contacts 73 so that the tracking mechanism may be operated by means of motor 55 at times other than when under control of opaque strips 80. Motor 55 is connected to a suitable source of potential from lines at 87 through two other sets of contacts 88 and 89, which represent the left and right limit switch contacts of the tracking mechanism. They are included in limit switch 65 (Fig. 6) and are operated by a dog 90 connected to rod 66 (Fig. 6). As an optional feature, warning light 91, also connected to the lines at 87 through another set of contacts 92, may be provided and so arranged that light 91 will glow one or two tracks before limit contacts 89 are opened to warn the operator that only a few available tracks remain on the film.

Figure 10:
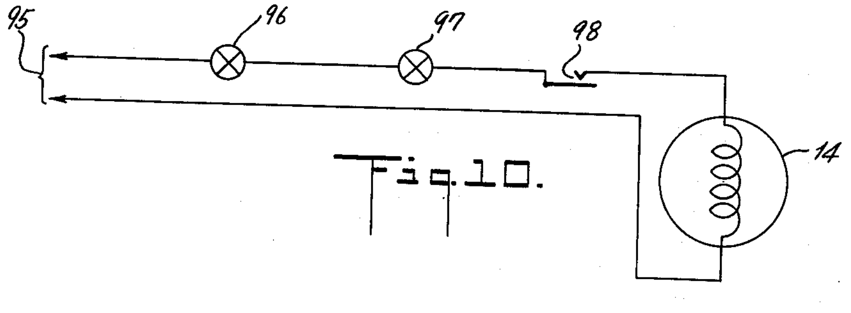
Fig. 10 is a schematic circuit diagram of the driving motor circuit of the embodiment of Fig. 1.

In Fig. 10 is shown a schematic circuit diagram for controlling the operation of drive motor 14. A suitable source of power from lines at 95 is connected in series with switches 96 and 97 and contacts 98 to motor 14. Switch 96 is under control of the operator of the recording machine, and switch 97 is under control of the person changing the magazine plates, who is called a threader. Contacts 98 are limit contacts and part of limit switch 65 (Fig. 6), being operated by dog 90 (Fig. 9) at the same time that contacts 89, which control the tracking motor 55 circuit, are opened. Thus, in order for motor 14 to rotate, the recording heads 27 (Fig. 1) must not be at the extreme edge of the film, the threader must have signified that the magazine plates and accompanying films are in place and properly threaded by closing his switch 96, and the operator of the recording machine must have signified that a recording is ready to be made by closing switch 97.

Figures 11, 12:
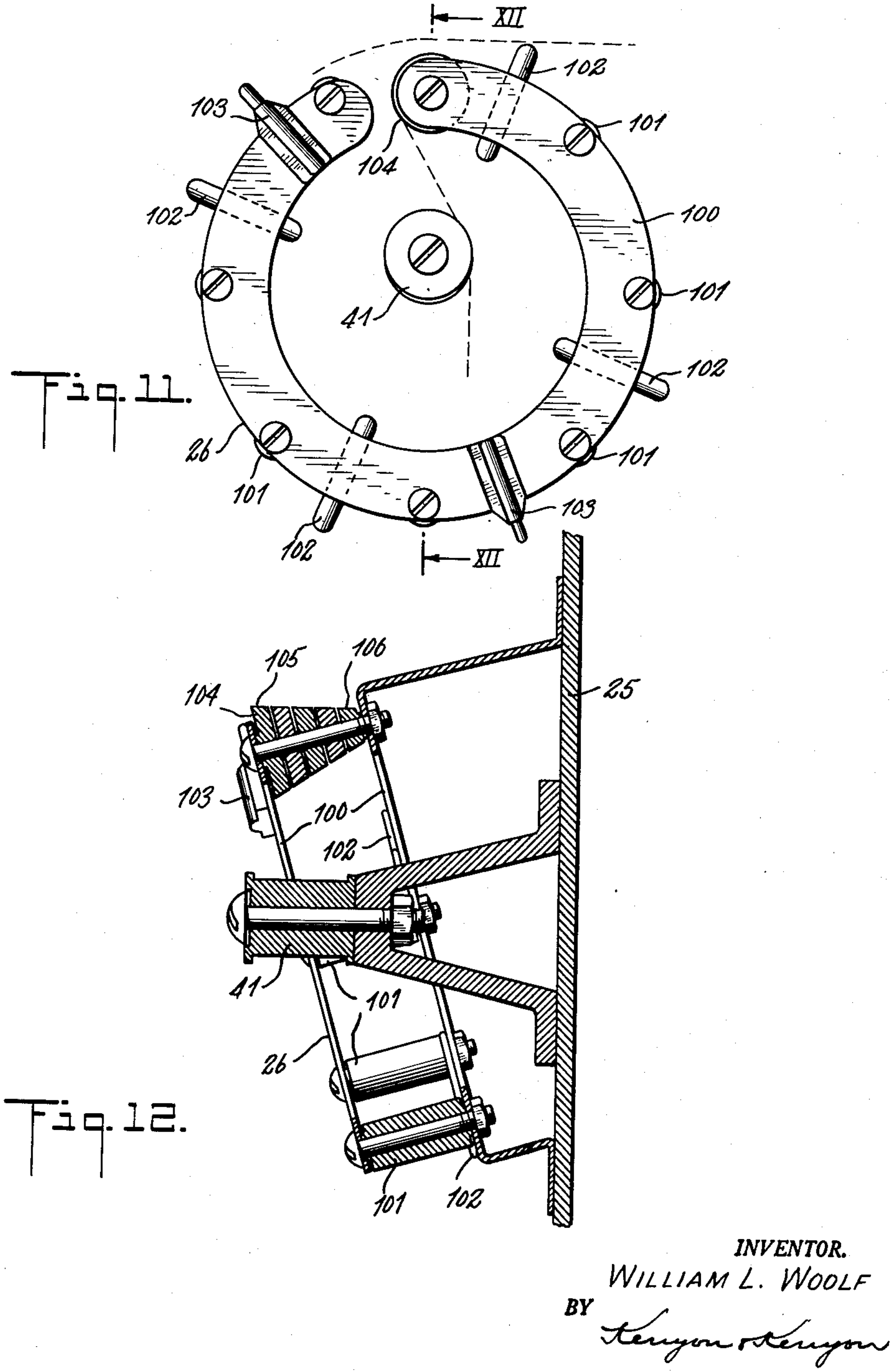
Fig. 11 is a side view of a film reel utilized for holding the film during recording in the embodiment of Fig. 1.
Fig. 12 is a cross-sectional view through plane XII—XII of Fig. 11 showing the details of the segmented film roller.

In Fig. 11 is shown a side view of a film reel suitable for holding the film during recording in the embodiment of Fig. 1, and in Fig. 12 is shown a cross-sectional view through plane XII—XII of Fig. 11. As illustrated, each reel comprises two side members 100 of split ring shape. Disposed around the periphery of and between the side members 100 are a plurality of rollers 101 on which the film rides. As pointed out previously, each film is a continuous length which will be fed from the inside of the reel and wound up on the outside as indicated by the dotted lines in Fig. 11. As shown in Fig. 12 the reel itself is mounted at an angle to film reel magazine 25. Film guides 102, in the form of pins which are preferably made of hardened steel, are secured to the inner surface of the inner side member 100, and film stays 103 are pivotally mounted on the outer side member 100 for similarly guiding the film and maintaining it on the reel, their pivotal feature, of course, being necessary for changing the film. To one end of the split side members 100 is rotatably secured a segmented roller 104, and an idler roller 41 is secured as shown to magazine 25 in such a position that the film coming from segmented roller 104 passes over it before continuing on to recording drum 10 (Fig. 1). Film reel 26 must be disposed at an angle to magazine 25 as shown, of course, because of the film being continuous. Previous reels for such continuous lengths of film have utilized conical rollers over which the film passes as it left the reel, but the use of such a conical roller caused much wear of the film, particularly at the edges, due to the different peripheral speeds at the two ends of the conical surface. By making conical roller 104 segmented, end section 105 can rotate with a slower angular motion than end 106 as the film passes thereover, the intermediate segments travelling at intermediate speeds, and thus wear and tear on the film due to friction between it and the conical roller is substantially minimized.

Referring mainly to Fig. 1, the use and operation of the recorder herein described is as follows, assuming that there is one magazine holder 22 mounted on either side of flywheel 11 in the manner shown, that eight L-shaped channel sections 24 are provided on each magazine holder 22, and that each film reel magazine 25 has mounted on it three film reels 26. With this arrangement, 24 films can be recorded simultaneously on drum 10 on either side of flywheel 11, making a total of 48 simultaneous film recordings. For normal use in the operation of such machine, four magazine holders 22 and thirty-two film reel magazines 25 should be provided so that while one set of recordings are being made, the threader can be loading another set of films to be interchanged with those upon the recorder as soon as those recordings are completed.

To replace the film upon an assembly comprising a magazine holder 22 and eight magazines 25 which have been removed from the recorder, each magazine 25 is removed from its L-shaped channel section 24 by unfastening the securing members, such as thumb screws 51 (Fig. 5), and the bracket arm 43 then moved to its raised position if this has not already been done. Thereafter, the magazine stays 103 (Fig. 11) of each reel 26 are rotated 90° so that the length of film can be slipped off the reel, the film from the lowest reel being removed first, the intermediate one second, and the upper one last, due to the way in which these reels 26 are mounted upon magazine 25. Thereafter, each reel 26 is loaded with fresh film in the reverse order to that given for unloading, and magazine stays 103 then returned to the position shown in Fig. 11 to maintain the length of film on the reel and guide it during operation. Each film is then threaded, care being taken to insure that the loop of film is led over the idler 41 of the particular reel 26, thence around common idlers 40 and 42, and finally around the idler corresponding to its reel 26. Thereafter, the magazine 25 is replaced and secured in its respective L-shaped section 24 of its magazine holder 22. It will be remembered that it was pointed out previously that connections from each recording head 27 and playback head 28 were automatically made or broken through plugs, not shown, connected to cable 35 when a magazine 25 was secured in position in or removed from, respectively, its L-shaped section 24. The same reloading process is then repeated for each other magazine 25, and each magazine 25 replaced and secured in its respective position in magazine holder 22, care being taken to insure that all tracking mechanisms 29 are properly mechanically connected by means of couplings 30. At the end of the recording period, the operator of the recorder shuts off the power to drive motor 14 by opening switch 97 (Fig. 10) even though this may have already been accomplished by limit switch contacts 98 (Fig. 10) being opened. Through mechanical linkages, not shown, connected to arms 39 (Fig. 3) each recording head 27 and playback head 28 is then raised from engagement with its respective film. The threader at the same time opens his power supply switch 96 (Fig. 10), moves the bracket arm 43 (Fig. 4) of each magazine 25 to its raised position, and disconnects each terminal plug 36 from its corresponding plug. Thereafter, one magazine holder 22 is lifted from engagement with dowel pins 23 and the entire assembly including this magazine holder 22 and its eight magazines 25 removed from the recorder by any suitable means such as a chain hoist, derrick, or manually. The other assembly, comprising the other magazine holder 22 and its eight accompanying magazines 25, is next removed from the recorder. Thereafter each duplicate magazine holder 22, whose eight magazines 25 are each reloaded with three fresh lengths of film, is brought into position in the recorder and aligned by means of dowel pins 23. It is to be noted that the square end and slotted end of the coupling 30 adjacent clutch 57 (Fig. 6) must be aligned when replacing each magazine holder 22 in order to insure that a positive mechanical connection is made to the various tracking mechanisms 29. Next the electrical connections from the recording heads 27 and playback heads 28 are made by inserting each terminal plug 36 into its corresponding plug. Thereafter the threader moves each bracket arm 43 to its lower position, which winds the films around the recording drum 10 in the proper position for recording. The threader then closes his power switch 96 and the operator lowers the recording heads 27 and playback heads 28 into engagement with the films. A recording is now ready to be made of whatever sounds are connected to each recording head 27 when the operator closes his switch 97, causing drive motor 14 and recording drum 10 to start rotating. It will be obvious that by providing a single phonograph whose pickup head is connected to each recording head 27 in parallel via plug 36, a duplicate recording can be made upon each of the forty-eight films corresponding to whatever record is being played upon the phonograph. Or, a microphone might be connected through a suitable amplifier to all recording heads 27 in parallel and the sounds adjacent the microphone during the recording would then be recorded upon each film. Still another alternative would be to connect one source of sounds to certain films, and another to the others, as desired. The purpose of providing a playback head 28 for each recording head 27 is, of course, so that the recording upon the film can be monitored. If it is found at any time that for some reason the recording is not being made properly, the cam arm 39 (Fig. 3) of that particular recording head 27 can be moved so as to lift that recording head 27 and thus stop recording upon that particular film.

When the fresh length of film is threaded upon each reel 26, it is preferably so arranged that its opaque strips 80 (Fig. 9) are in the same relative position with respect to its reel 26. For example, assuming that there are the same number of opaque strips 80 on each film, these might be so positioned that the last strip of each film is aligned on common idler 40. Thus, the tracking of each film would be synchronized, tracking motor 55 (Fig. 6) being controlled by a single film, as indicated in Fig. 4. Also, sometime between the completion of a recording period and the time that particular magazine, having been reloaded, is replaced in the recorder, each tracking mechanism has its lead screw 62 (Fig. 6) rotated back so that all recording heads 27 and playback heads 28 are lined up in their zero position for recording in the first track. This movement of each tracking mechanism 29 back to the zero position may be made the duty of the threader sometime during the reloading period, the tracking mechanisms 29 of each magazine 25 being operated manually as, for instance, by inserting a square-ended crank in the slotted end of the coupling 30 adjacent limit switch 65 (Fig. 6) and rotating this crank the necessary number of turns. As an alternative, this may be done by the operator after the heads 27 and 28 had been lifted from the film, but prior to removal of the recorded films, in which case tracking motor 55 would be made reversible and spring-loaded clutch 57 (Fig. 6) replaced by a manually operated one.

When a number of duplicate recordings are being made from a master record on a phonograph, its pickup head is usually connected through an amplifier to each recording head 27 in parallel, and a gain control, such as a rheostat, inserted in each recording head line in order to allow adjustment so that equal amounts of energy are delivered to each recording head 27. Normally, the phonograph motor would be adjusted to rotate at the same speed as that at which the master record was originally made and drive motor 14 adjusted to give the normal linear speed of travel of the film. However, since it is sometimes difficult to record high frequencies on film, as an alternative, both the phonograph motor and drive motor 14 might be operated at a reduced speed. Thus if both motors were operated at one-half normal speed, 8,000 cycle tones would appear on the film at the time of recording as 4,000 cycle tones. Thereafter, for normal playback, each film would, of course, be driven at normal or twice the linear speed at which it was recorded, and the 8,000 cycle tones would be audible at 8,000 cycles again.

Thus, it is obvious that there has been provided a recorder for making a number of simultaneous different or duplicate recordings in which the available recording time is utilized to its maximum extent through the use of readily interchangeable film magazines, in which wear and tear on the films is minimized, and in which tracking is accomplished in a reliable manner without weakening the film. Moreover, this recorder is simple, reliable, and efficient in operation and requires only two attendants, an operator and a threader, the threader removing recorded film from one set of reels and replacing it with fresh film during the period when the operator is monitoring the recording of another set of films. Thus, as described fully above, film changing or nonrecording time of the machine is reduced to a minimum.

Numerous additional applications of the above-disclosed principles will occur to those skilled in the art and no attempt has been made to exhaust such possibilities. For example, by suitable modifications of the reels 26, recording heads 27, playback heads 28, and tracking mechanisms 29, recording might be done magnetically upon wires or tapes instead of upon films as exemplified. Also, while three reels 26 have been shown upon each magazine 25 and eight magazines described for each holder 22, a greater or lesser number might be used as desired, and as is known in the prior art, horizontally mounted reels might be substituted for the substantially vertically mounted ones exemplified to allow a greater number of reels to be mounted in a given space. Similarly, a fixed bed might be provided for recording and/or playback and drum 10 used merely for driving purposes.

The scope of this invention is defined in the following claims.

What is claimed is:

1. In apparatus of the class described for making simultaneously a plurality of endless film recordings for interchangeable use upon a playback machine, the combination of a film driving member; a plurality of film reels wherein each film reel having its axis disposed obliquely to the axis of the film driving member and including a conical roller formed of a plurality of independent rotatable frusto-conical segments for and rotatably secured to each film reel for guiding the film as it leaves the reel, whereby the different segments of each of said rollers can rotate at different angular speeds in order to prevent undue friction between the roller and the film passing thereover and thereby alleviate film wear; a plurality of film guides adjacent said member in spaced relation such that films from said reels may be fed side-by-side over said member but not completely therearound said member comprising a shaft adapted to engage and drive all such films at a uniform speed; a plurality of recording heads, one for and so disposed adjacent each film reel that it will be in register with the film of its reel; and a tracking mechanism comprising a mounting for each recording head and interconnections therebetween for providing synchronized movement of said heads transverse to the path of motion of the films; whereby each endless recorded film will be identical in position and form and each endless film may quickly and easily be inserted in or removed from its operative position upon said film driving member without being threaded around the end thereof.

2. In apparatus of the class described for making recordings upon a plurality of endless films, each having a section including a series of regularly spaced opaque portions, for interchangeable use upon a suitable playback machine, the combination of a film driving member; a plurality of film reels; a plurality of film guides adjacent said member in spaced relation such that films from said reels may be fed side-by-side over said member, said member comprising a shaft adapted to engage and drive all such films at a uniform speed; a plurality of recording heads, one for and so disposed adjacent each film reel that it will be in register with the film of its reel; a tracking mechanism comprising a mounting for each recording head and interconnections therebetween for providing synchronized movement of said heads transverse to the path of motion of the films; a photoelectric cell disposed adjacent a film reel in viewing relationship of its film; a tuned amplifier tuned to a frequency determined by the spacing of the opaque portions and the speed at which the film is fed during recording; a relay having an armature, the input of said amplifier being connected to said photoelectric cell and its output being connected to said relay; a tracking motor whose shaft is connected to said tracking mechanism; a disk connected to said motor shaft and having a plurality of similar indentations on its periphery; an arm pivotally mounted adjacent said disk and having at one end a pawl adapted to enter an indentation of said disk; a spring maintaining said pawl in engagement with the periphery of said disk; a mechanical connection between the armature of said relay and said arm; and a pair of contacts connected in series with said motor and a suitable source of power and mechanically connected to said pawl so that they are open when said pawl is in an indentation of said disk and closed when said pawl is withdrawn therefrom; whereby when a series of opaque portions of a film are viewed by said cell, a momentary output is produced from the tuned amplifier which actuates the relay so that the pawl is withdrawn from an indentation in the disk, thereby closing the circuit to the motor through the contacts and causing it and the tracking mechanism to continue to rotate until the pawl is free to enter another indentation of the disk, and each endless recorded film will thus be identical in position and form.

3. In apparatus of the class described for making simultaneously a plurality of endless film recordings for interchangeable use upon a playback machine, the combination of a film driving member; a removable film reel magazine adapted to be mounted adjacent and substantially at right angles to the axis of said member; an idler rotatably secured to said magazine such that it is disposed adjacent said member when the magazine is in its film recording position; a plurality of film reels mounted on said magazine in axially spaced relation such that films from said reels may be fed side-by-side around said idler and over said member but not completely therearound, said member comprising a shaft adapted to engage and drive all such films at a uniform speed, and each reel having its center lying on a common cylindrical surface described about the axis of the idler; a plurality of recording heads, one for and so disposed adjacent each film reel that it will be in register with the film of its reel and said member; and a tracking mechanism comprising a mounting for each recording head and interconnections therebetween for providing synchronized movement of said heads transverse to the path of motion of the films; whereby each endless recorded film will be identical in position and form, and each endless film may quickly and easily be inserted in or removed from its operative position upon said film driving member without being threaded around the end thereof, and recorded films may be rapidly and readily removed and replaced with fresh film by means of the magazine.

References Cited in the file of this patent

UNITED STATES PATENTS

| Number | Name | Date |
|---|---|---|
| 463,188 | Gibboney | Nov. 17, 1891 |
| 520,106 | Cox | May 22, 1894 |
| 980,378 | Wiggins | Jan. 3, 1911 |
| 994,042 | Vebelmesser | May 30, 1911 |
| 1,265,039 | Bower | May 7, 1918 |
| 1,811,817 | Stille | June 23, 1931 |
| 2,066,041 | Kiel | Dec. 29, 1936 |
| 2,168,529 | Konishi | Aug. 8, 1939 |
| 2,178,673 | Serrurier | Nov. 7, 1939 |
| 2,251,306 | Thompson | Aug. 5, 1941 |
| 2,255,724 | Sunell | Sept. 9, 1941 |
| 2,292,856 | Woolf et al. | Aug. 11, 1942 |
| 2,294,854 | Steed | Sept. 1, 1942 |
| 2,295,000 | Morse | Sept. 8, 1942 |
| 2,335,586 | De Sart | Nov. 30, 1943 |
| 2,481,398 | Danisch | Sept. 6, 1949 |
| 2,481,904 | Camras | Sept. 13, 1949 |
| 2,503,925 | Tinkham | Apr. 11, 1950 |
| 2,528,279 | Leedy et al. | Oct. 31, 1950 |
| 2,551,198 | Barrett | May 1, 1951 |
| 2,586,666 | Kuhlik | Feb. 19, 1952 |

FOREIGN PATENTS

| Number | Country | Date |
|---|---|---|
| 325,083 | Great Britain | Feb. 13, 1930 |
| 377,276 | Great Britain | July 22, 1932 |